United States Patent
Vicenza et al.

(10) Patent No.: US 6,848,946 B2
(45) Date of Patent: Feb. 1, 2005

(54) ELECTRICAL FUSE REALY BOX, APPARATUS, METHOD AND ARTICLE OF MANUFACTURE

(75) Inventors: Aguinaldo Vicenza, Branganca Paulista (BR); Pedro La Martine De Faria, Branganca Paulista (BR); Joannes Willen Maria Roosdorp, Branganca Paulista (BR)

(73) Assignee: Tyco Eletro-Eletronica LTDA., Bramganca Paulista (BR)

(*) Notice: Subject to any disclaimer, the term of this patent is extended or adjusted under 35 U.S.C. 154(b) by 0 days.

(21) Appl. No.: 10/617,016

(22) Filed: Jul. 10, 2003

(65) Prior Publication Data

US 2004/0021547 A1 Feb. 5, 2004

Related U.S. Application Data

(60) Provisional application No. 60/399,649, filed on Jul. 30, 2002.

(51) Int. Cl.$^7$ .............................................. H01R 33/95
(52) U.S. Cl. ...................................... 439/622; 439/718
(58) Field of Search ............................. 439/76.2, 622, 439/718; 361/729, 730, 732

(56) References Cited

U.S. PATENT DOCUMENTS

| | | | | |
|---|---|---|---|---|
| 4,749,359 A | * | 6/1988 | White | 439/133 |
| 5,023,752 A | * | 6/1991 | Detter et al. | 361/752 |
| 5,179,503 A | * | 1/1993 | Fouts et al. | 361/729 |
| 5,207,587 A | * | 5/1993 | Hamill et al. | 439/76.2 |
| 5,755,579 A | * | 5/1998 | Yanase et al. | 439/76.2 |
| 5,831,814 A | * | 11/1998 | Hamill | 361/627 |
| 5,995,380 A | * | 11/1999 | Maue et al. | 361/826 |
| 6,077,102 A | * | 6/2000 | Borzi et al. | 439/364 |
| 6,126,457 A | * | 10/2000 | Smith et al. | 439/76.2 |
| 6,152,758 A | * | 11/2000 | Matsuoka | 439/364 |
| 6,570,088 B1 | * | 5/2003 | Depp et al. | 174/50 |
| 6,683,950 B1 | * | 1/2004 | Harwood et al. | 379/413.02 |

FOREIGN PATENT DOCUMENTS

| | | | | |
|---|---|---|---|---|
| EP | 0 627 754 A1 | 12/1994 | | H01H/85/20 |
| EP | 0 665 570 A2 | 8/1995 | | H01H/85/20 |

* cited by examiner

Primary Examiner—Khiem Nguyen

(57) ABSTRACT

A pre-assembled electrical fuse relay box comprising a frame, wherein the frame comprises an upper compartment, a lower compartment, and at least one locking receiver. The fuse box further comprises a plurality of electrical components pre-assembled within the upper compartment, a plurality of connector modules pre-assembled within the lower compartment, an upper cover pivotally mounted on the upper compartment, and a lower cover pivotally mounted on the lower compartment, wherein the connector modules are dimensioned and configured for electrically engaging electrical wires. Each of the upper and lower covers comprise a locking member dimensioned and configured to engage the locking receiver. Moreover, the electrical components comprise relays, circuit breakers, J-case fuses, and blade fuses. The connector modules comprise connection contacts, which extend through the frame and make an electrical connection with the electrical components.

22 Claims, 4 Drawing Sheets

ELECTRICAL FUSE REALY BOX, APPARATUS, METHOD AND ARTICLE OF MANUFACTURE

CROSS-REFERENCE TO RELATED APPLICATIONS

This application claims the benefit of U.S. Provisional Patent Application No. 60/399,649 filed Jul. 30, 2002, the complete disclosure of which is hereby incorporated by reference.

FIELD OF THE INVENTION

The present invention generally relates to electrical fuse relay boxes, and more particularly to electrical fuse relay boxes for mounting in the engine or passenger compartment of a motor vehicle.

BACKGROUND OF THE INVENTION

Fuse boxes are utilized in many applications, one example of which being motor vehicles. Typically, fuse boxes are placed within a designated area on a motor vehicle, such as, for example, under the hood within the engine compartment or under the dashboard and near the foot area of the interior of the motor vehicle. Generally, fuse boxes house electrical fuses for individual electrical load components within the motor vehicle, such as individual lights or small electrical equipment items, and also house electrical fuses for cables carrying larger amounts of current splitting off from the fuse box for servicing entire load sections within the motor vehicle. Moreover, fuses are also used in automotive electrical systems to protect circuits against potential damage caused by overload conditions, such as a result of multiple electrical load requirements and surges occurring simultaneously. Usually, fuses for various circuits are collected together at a confluence point, known as a fuse box, a fuse relay box, a power distribution block, or a junction block.

Conventionally, a fuse box is a molded plastic structure containing electrical terminals, one or more bus bars, and various other electrical components, such as circuit breakers and diodes integrated together. The fuses are maintained in terminal sockets integrally molded on the outer surface of the fuse box. Typical automotive fuses have a generally rectangular plastic body with a pair of contacts extending from one end, and when the fuse is fully inserted into its respective terminal socket, the contacts engage electrical terminals inside of the fuse box to complete a circuit.

Each electrical subcomponent that is incorporated into a conventional electrical fuse relay box, such as a plastic box, relays, fuses (e.g., mini, maxi, J-Case), circuit breakers, and diodes, etc. (collectively referred to as "electrical components"), are ordinarily manufactured separately and purchased individually from different suppliers, and must be assembled collectively to be integrated within a finished fuse relay box. This process of assembly is often time consuming, expensive, and susceptible to errors in connections, and overall deficient quality. Moreover, conventional fuse boxes are generally manufactured without covers, and therefore are susceptible to damage.

Therefore, there is a need for a novel pre-assembled fuse box system having all electrical components preset to their correct position, and which may be readily mounted within motor vehicle compartments quickly, easily, and without error. Moreover, there is a need for a system that enables customers to receive all of the electrical components already incorporated in the fuse box without requiring further assembly of the electrical components to form a unified device.

SUMMARY OF THE INVENTION

In view of the foregoing and other problems, disadvantages, and drawbacks of conventional fuse boxes, various embodiments of a pre-assembled electrical fuse relay box are disclosed herein.

In accordance with one exemplary embodiment, a pre-assembled electrical fuse relay box, and a method of manufacturing the same is disclosed, comprising a frame, wherein the frame comprises an upper compartment, a lower compartment, and at least one locking receiver. The fuse box further comprises a plurality of electrical components pre-assembled within the upper compartment, a plurality of connector modules pre-assembled within the lower compartment, an upper cover pivotally mounted on the upper compartment, and a lower cover pivotally mounted on the lower compartment, wherein the connector modules are dimensioned and configured for electrically engaging electrical wires. Each of the upper and lower covers comprises a locking member dimensioned and configured to engage the locking receiver. Moreover, the electrical components comprise relays, circuit breakers, J-case fuses, and blade fuses. The connector modules comprise connection contacts, which extend through the frame and make an electrical connection with the electrical components.

One advantage of embodiments disclosed herein is that electrical components such as relays, fuses, diodes, and circuit breakers are already mounted in their final position. Therefore, the customer is not required to use special diagnostic equipment to assure that the components and connector modules are properly mounted and in the correct position.

Another advantage of embodiments disclosed herein is that an electrical fuse relay box is provided that includes both an upper cover and a lower cover, which allows mounting in the engine compartment of a car or other motor vehicle.

BRIEF DESCRIPTION OF THE DRAWINGS

The foregoing will be better understood from the following detailed description with reference to the drawings, in which.

DETAILED DESCRIPTION

An embodiment of the present invention provides a fuse box having the capability to have electrical components pre-assembled and preset to their correct position, and which may also be readily mounted within a compartment quickly, easily, and without error.

Figure 1:
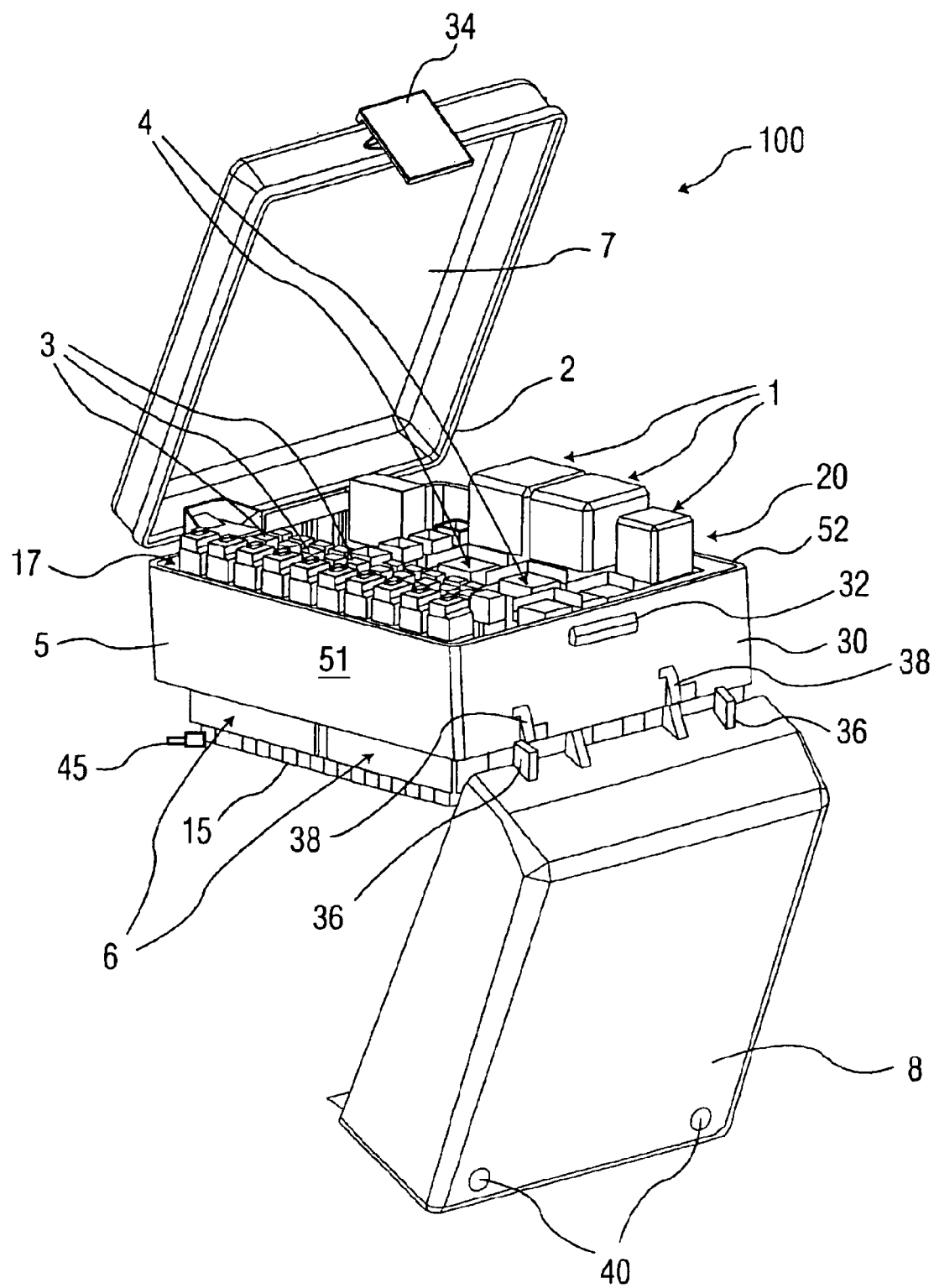
FIG. 1 is a perspective view of an electrical fuse relay box according to one embodiment of the present invention.
Figure 2:
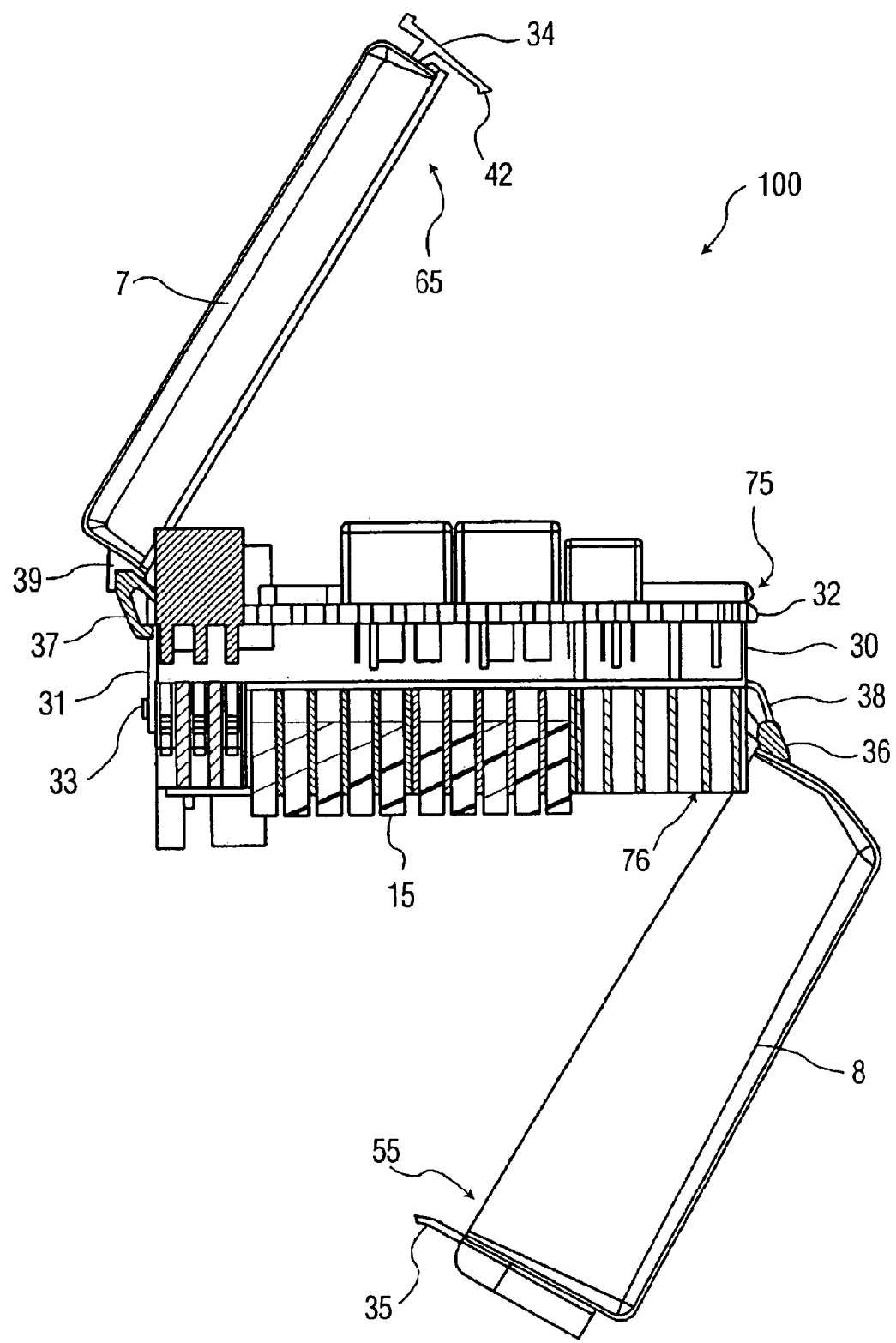
FIG. 2 is a schematic diagram of the electrical fuse relay box of FIG. 1.
Figure 3:
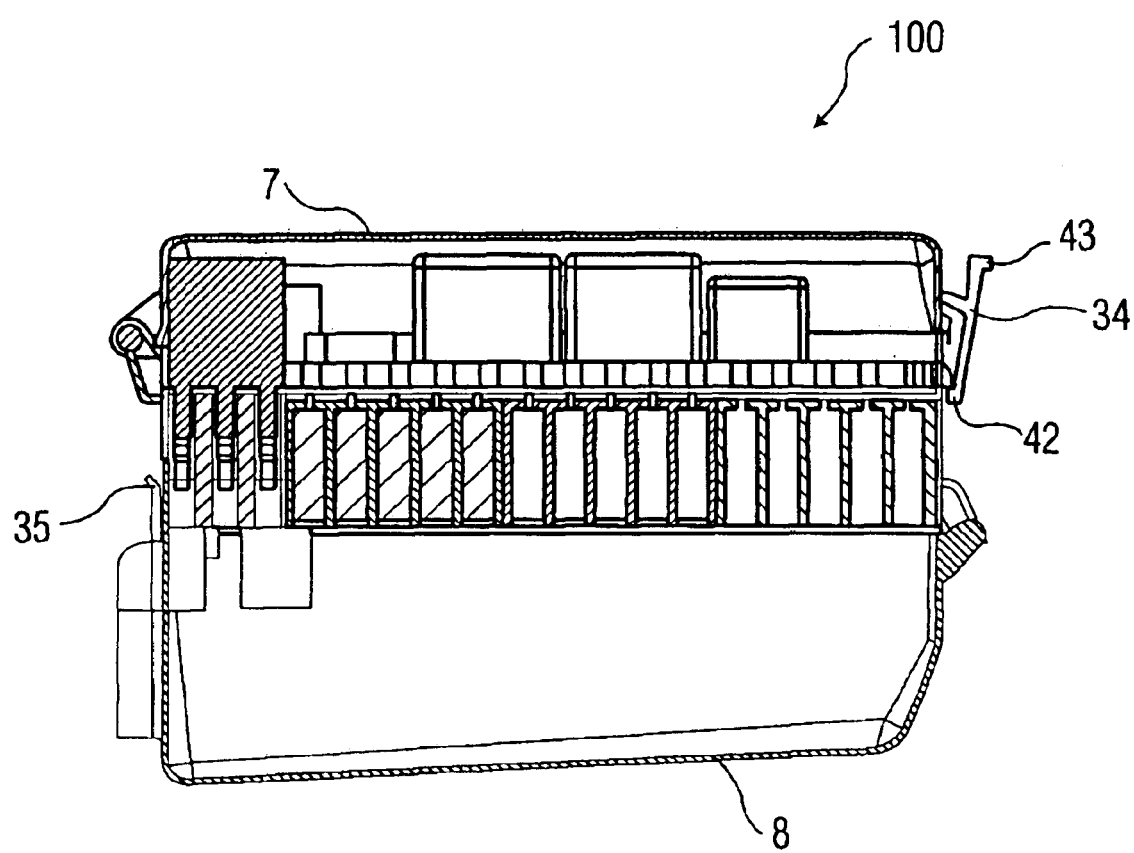
FIG. 3 is a schematic diagram of the electrical fuse relay box of FIG. 1 shown in a closed position.

Referring now to the drawings in detail, and more particularly to FIGS. 1 through 4, there are shown exemplary embodiments of the structures and methods according to the present invention. FIGS. 1 through 3 illustrate an electrical fuse relay box 100 comprising a plurality of electrical components 20 including relays 1, a circuit breaker 2, J-case fuses 3, and blade fuses 4 collectively pre-assembled, preset, and mounted in their final position within a frame 5, wherein the frame 5 is pivotally attached to an upper cover 7 and a lower cover 8.

Preferably, the electrical fuse box 100 comprises a frame 5, a plurality of electrical components 20 pre-assembled within the frame 5, a plurality of connector modules 6 pre-assembled within the frame 5, an upper cover 7 mounted on the frame 5, and a lower cover 8 mounted on the frame 5, wherein the connector modules 6 are dimensioned and configured for electrically engaging electrical wires, and wherein the connector modules 6 comprise connection contacts 15, which extend through the frame 5 and make an electrical connection with the electrical components 20.

The frame 5 comprises at least one locking receiver 32, 33, and each of the upper cover 7 and lower cover 8 comprise a locking member 34, 35, respectively, dimensioned and configured to engage the locking receiver 32, 33, respectively. Moreover, each of the upper cover 7 and lower cover 8 are pivotally mounted on the frame 5.

Preferably, the frame 5 includes an upper compartment 75 and lower compartment 76, wherein the upper compartment 75 houses the electrical components 20, and the lower compartment 76 houses a plurality of connector modules 6. Moreover, the frame 5 comprises a pair of generally elongated sidewalls 51, 52, which are positioned opposite one another, and are separated by a pair of end walls 30, 31. End wall 30 comprises a lock catch (locking receiver) 32, which is angled to provide a stable locking unit mechanism for the fuse box 100 upon closure. As illustrated in FIGS. 2 and 3, end wall 30 further comprises at least one pivot hinge 38 dimensioned and configured to receive a corresponding pivot member 36. At least one pivot member 36 is positioned on the lower cover 8 and pivotally mounts to pivot hinge 38, thereby allowing the lower cover 8 to articulate from an open to closed position.

The lower cover 8 further includes a locking lever 35, fixably attached to the free end 55 of the lower cover 8 in this embodiment, wherein the locking lever 35 protrudes outwardly from the lower cover 8. Furthermore, a plurality of apertures 40 are spaced in the lower cover 8, and upon closure of the lower cover 8, the apertures 40 align with securing brackets 45, wherein securing means (not shown) may be used to secure and mount the closed fuse box 100 to a vehicle compartment.

End wall 31 further comprises a lock catch 33, which is adapted to engage the locking lever 35 of the lower cover 8, wherein the locking lever 35 is dimensioned and configured to provide stable union with the lock catch 33 upon closure of the lower cover 8 upon the frame 5. End wall 31 further comprises at least one pivot hinge 37 dimensioned and configured to receive a corresponding pivot member 39. At least one pivot member 39 is positioned on the upper cover 7 and pivotally mounts to pivot hinge 37, thereby allowing the upper cover 7 to articulate from an open to closed position.

The upper cover 7 further includes a locking member 34, fixably attached to the free end 65 of the upper cover 7 in this embodiment, wherein the locking member 34 comprises a protruding lip 42 for engaging the lock catch 32 of the end wall 30 of frame 5. Upon closure of the upper cover 7, the lip 42 engages lock catch 32, and the upper cover 7 becomes locked. Unlocking the upper cover 7 is accomplished by engaging a bias member 43, which is positioned opposite the lip 42 on the locking member 34.

Connector modules 6 are included in a pre-assembled, and preferably unlocked position, as best shown in FIG. 2. The connector modules 6 are used for connecting the fuse box 100 with electrical power and are capable of receiving wire terminals (not shown) for wire connections. For example, connector modules 6 may include metal blade contacts 15 as shown in FIGS. 2 and 3 and the wire terminals (not shown) may comprise sealed or unsealed metal terminals (not shown) that clip onto the metal contacts 15 in a conventional manner. The contact blades 15 may extend up through the frame 5 and into a channel 17 for receiving the electrical components 20, thus making an electrical connection therebetween.

After terminal insertion, connector modules 6 are preferably pushed into position to accomplish the aforementioned electrical contact between the electrical components 20 and wire terminals, as shown in FIG. 3, and meet a secondary locking feature inside the fuse box frame 5. This has an advantage of helping to ensure a positive locking of the terminals.

Upper cover 7 is preferably supplied in a closed position and is not required to be opened prior to installation. Lower cover 8 is also known as a wire dress to those of ordinary skill in the art, because it protects and guides the wires after harness assembly. Lower cover 8 is also preferably supplied in a closed position, making the complete fuse box 100 only one volume or unit. Lower cover 8 need only be opened to insert the electrical wires into the terminals.

Figure 4:
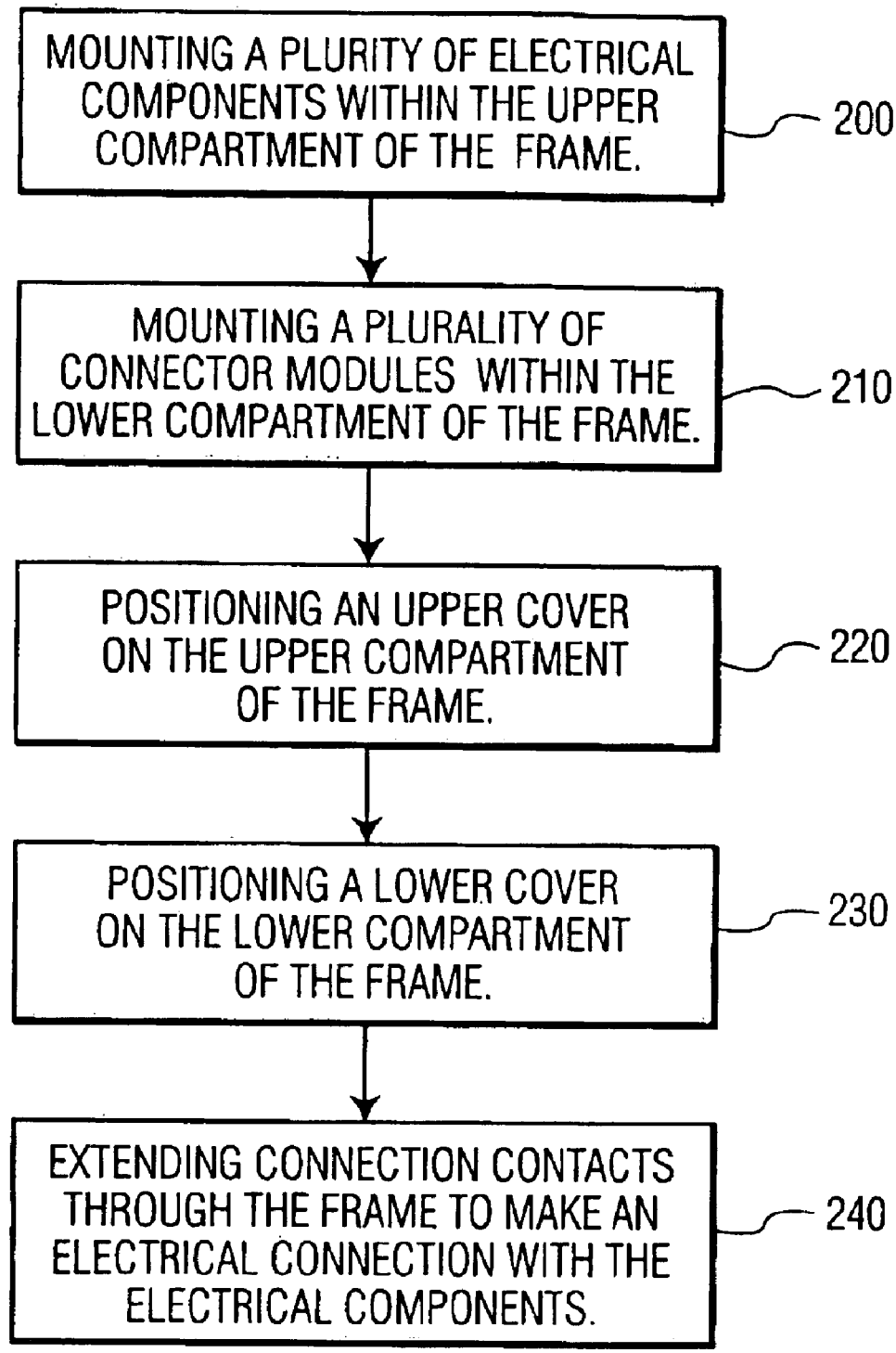
FIG. 4 is a flow diagram illustrating an exemplary method in accordance with the present invention.

A method of pre-assembling an electrical fuse relay box 100 is illustrated in the flow diagram shown in FIG. 4. The method comprises mounting a plurality of electrical components within the upper compartment 75 of the frame 5 of the fuse box 100 at step 200. Second, a plurality of connector modules 6 are mounted within the lower compartment 76 of the frame 5 of the fuse box 100 at step 210, wherein the connector modules 6 are configured for electrically engaging electrical wires, and wherein the connector modules 6 comprise connection contacts 15. Next, an upper cover 7 is positioned on the upper compartment 75 of the frame 5 at step 220. Then, a lower cover is positioned on the lower compartment 76 of the frame 5 at step 230. Finally, connection contacts 15 are extended through the frame 5 to make an electrical connection with the electrical components 20 at step 240.

The present embodiment has an advantage over conventional fuse frames whereby electrical components such as relays, fuses, diodes, and circuit breakers are already mounted in their final position. Therefore, the customer is not required to use special diagnostic equipment to assure that the components and connector modules are properly mounted and in the correct position.

Also, unlike conventional systems, the electrical fuse relay box 100 of the present embodiment includes both an upper cover 7 and a lower cover 8, that enable mounting in the engine compartment of a car or other vehicles.

Although this invention has been described with reference to particular embodiments, it will be appreciated that many variations may be resorted to without departing from the spirit and scope of this invention as set forth in the appended claims.

What is claimed is:

1. An electrical fuse box comprising:

a frame;

a plurality of electrical components pre-assembled within said frame;

a plurality of connector modules pre-assembled within said frame, wherein said connector modules are dimensioned and configured for electrically engaging electrical wires;

an upper cover pivotally mounted on said frame; and a lower cover pivotally mounted on said frame.

2. The electrical fuse box of claim 1, wherein said electrical components comprise relays, circuit breakers, J-case fuses, and blade fuses.

3. The electrical fuse box of claim 1, wherein said connector modules comprise connection contacts.

4. The electrical fuse box of claim 3, wherein said connection contacts extend through said frame and make an electrical connection with said electrical components.

5. The electrical fuse box of claim 1, wherein said frame comprises at least one locking receiver.

6. The electrical fuse box of claim 5, wherein each of said upper cover and lower cover comprise a locking member dimensioned and configured to engage said locking receiver.

7. An electrical fuse relay box comprising:

a frame, wherein said frame comprises an upper and a lower compartment;

a plurality of electrical components pre-assembled within said upper compartment;

a plurality of connector modules pre-assembled within said lower compartment, wherein said connector modules are dimensioned and configured for electrically engaging electrical wires;

an upper cover pivotally mounted on said upper compartment; and a lower cover pivotally mounted on said lower compartment.

8. The electrical fuse relay box of claim 7, wherein said electrical components comprise relays, circuit breakers, J-case fuses, and blade fuses.

9. The electrical fuse relay box of claim 7, said connector modules comprise connection contacts.

10. The electrical fuse relay box of claim 9, wherein said connection contacts extend through said frame and make an electrical connection with said electrical components.

11. The electrical fuse relay box of claim 7, wherein said frame comprises at least one locking receiver.

12. The electrical fuse relay box of claim 11, wherein each of said upper cover and lower cover comprise a locking member dimensioned and configured to engage said locking receiver.

13. An electrical fuse relay box comprising:

a frame, wherein said frame comprises an upper compartment, a lower compartment, and at least one locking receiver;

a plurality of electrical components pre-assembled within said upper compartment;

a plurality of connector modules pre-assembled within said lower compartment, wherein said connector modules are dimensioned and configured for electrically engaging electrical wires;

an upper cover pivotally mounted on said upper compartment; and a lower cover pivotally mounted on said lower compartment, wherein each of said upper cover and lower cover comprise a locking member dimensioned and configured to engage said locking receiver.

14. The electrical fuse relay box of claim 13, wherein said electrical components comprise relays, circuit breakers, J-case fuses, and blade fuses.

15. The electrical fuse relay box of claim 13, said connector modules comprise connection contacts.

16. The electrical fuse relay box of claim 15, wherein said connection contacts extend through said frame and make an electrical connection with said electrical components.

17. A method of pre-assembling an electrical fuse relay box, said electrical fuse relay box comprising a frame having an upper compartment and a lower compartment, said method comprising:

mounting a plurality of electrical components within said upper compartment;

mounting a plurality of connector modules within said lower compartment, wherein said connector modules being configured for electrically engaging electrical wires;

positioning an upper cover to be pivotally mounted on said upper compartment; and positioning a lower cover to be pivotally mounted on said lower compartment.

18. The method of claim 17, wherein said electrical components comprise relays, circuit breakers, J-case fuses, and blade fuses.

19. The method of claim 17, wherein said connector modules comprise connection contacts.

20. The method of claim 19, further comprising extending said connection contacts through said frame to make an electrical connection with said electrical components.

21. The method of claim 17, wherein said frame comprises at least one locking receiver.

22. The method of claim 21, wherein each of said upper cover and lower cover comprise a locking member dimensioned and configured to engage said locking receiver.

* * * * *